March 11, 1947. H. E. HUBER, JR 2,417,164
HYDROCARBON SYNTHESIS
Filed Nov. 23, 1944
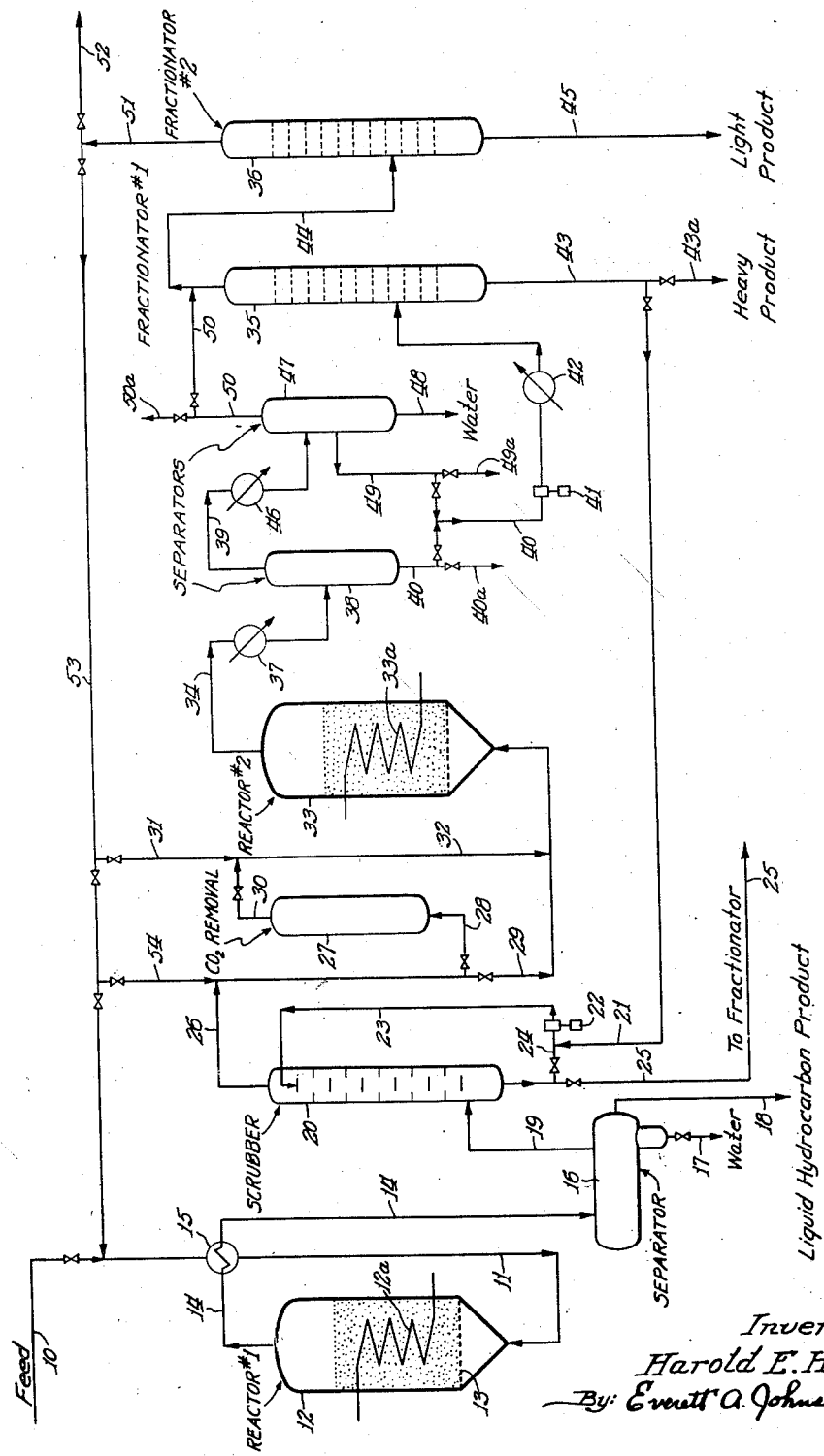
Inventor:
Harold E. Huber, Jr.
By: Everett A. Johnson
Atty.

Patented Mar. 11, 1947

2,417,164

UNITED STATES PATENT OFFICE 2,417,164

HYDROCARBON SYNTHESIS

Harold E. Huber, Jr., Louisville, Ky., assignor to Standard Oil Company, Chicago, Ill., a corporation of Indiana Application November 23, 1944, Serial No. 564,811

4 Claims. (Cl. 260—449.6)

This invention relates to hydrocarbon synthesis and it pertains more particularly to an improved method and means for producing normally liquid hydrocarbons from carbon monoxide and hydrogen.

When hydrogen-carbon monoxide mixtures are contacted with iron type of catalyst under suitable operating conditions, a considerable proportion of the product is olefinic and these unsaturated hydrocarbons are desirable constituents of high-quality products. This process, however, gives only low yields of hydrocarbons, and it is an important object of my invention to increase the yield of hydrocarbons rich in olefins.

A further object of the invention is to provide a system employing different catalysts in series to obtain increased quantities of hydrocarbons having more than one carbon atom to the molecule and increased proportions of olefinic hydrocarbons. Another object is to provide an improved system employing a plurality of catalyst stages. A more specific object of my invention is to provide a system wherein the more active Co type catalyst is used for clean up of reactants. Still another object is to provide a unique sequence of catalysts whereby a substantially sulfur-free feed gas of the proper proportions is supplied to the highly sulfur-sensitive cobalt-type catalyst.

Of the most important problems in the synthesis of hydrocarbons from carbon monoxide and hydrogen is that of temperature control in the synthesis step. The reaction is highly exothermic, and it is not only necessary to remove the vast amount of heat evolved, but it is also necessary that the conversion temperature in the synthesis zone be maintained within rather narrow limits. Any undue temperature rise or hot spots tend to cause the reaction to "run away" and to produce methane instead of liquid hydrocarbons. An object of my invention, therefore, is to provide a method and means whereby the heat of synthesis can be removed and the reaction temperature may be controlled within relatively narrow ranges while avoiding the inevitable difficulties with fixed bed operations.

A further object of this invention is to provide an improved method and means for employing the so-called "fluid" type catalyst technique in effecting optimum hydrocarbon synthesis from carbon monoxide and hydrogen. In this technique catalyst solids of small-particle size are fluidized by up-flowing gasiform materials within the synthesis zone so that the catalyst in the zone is maintained as a turbulent liquid-like dense phase. The extreme turbulence of the suspended catalyst particles permits my maintaining uniform temperatures throughout the entire mass of catalyst. With catalyst particles of the order of 2 to 200 microns or larger, preferably 10 to 100 microns in particle size, the vertical gasiform fluid velocities of the order of about .4 to 6 feet per second, a liquid-like dense phase of catalyst may be obtained in which the density is about 30 to 90%, preferably about 40 to 80%, e. g., about 60% of the density of the settled catalyst material. With supported catalysts a velocity of between about .4 foot to about 4 feet, for example about 2 feet per second, can be used. In the use of unsupported catalyst, a velocity of between about 1.5 and 6 feet, for example, about 4 feet per second, can be used.

The foregoing and other objects and advantages will become apparent to those skilled in the art as the description of my invention proceeds.

In practicing my invention I employ hydrogen-carbon monoxide ratios between about 1:1 and about 2:1 for the iron-type catalyst and in ratios of about 2:1 for cobalt-type catalyst. The catalysts in either case are of relatively small particle size to permit their being "fluidized" by an up-flowing gasiform fluid stream. As pointed out above, the maintenance of the suspended dense turbulent catalyst phase within the synthesis zone insures uniform temperature throughout the reactor.

The hydrogen-carbon monoxide mixture can suitably be obtained with natural gas (which may consist chiefly of methane) as the raw material. However, my invention is not limited to the source of the carbon monoxide-hydrogen mixture and may be obtained for example, from coal, shale, or other carbonaceous materials. When natural gas is used, the synthesis gas may be prepared by reacting natural gas, carbon dioxide, and steam non-catalytically at temperatures above about 2000° F. or in the presence of a catalyst such as supported nickel at a temperature of between about 1400 and 1800° F. at substantially atmospheric pressure. For the cobalt-type catalyst, the proportions of methane, steam, and carbon dioxide should be such as to give a synthesis gas consisting essentially of hydrogen and carbon monoxide in approximately 2:1 mole ratio. For iron-type catalyst, the natural gas may be reacted with carbon dioxide to give a hydrogen-carbon monoxide ratio of between about 1:1 and 1.8:1.

The catalyst for the first stage of the synthesis reaction is of the iron type which permits the reaction

and the catalyst for the second stage is of the cobalt type promoting the reaction

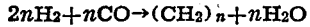

In general the iron-type catalysts operate at higher temperatures and pressures than cobalt-type catalysts. The catalysts should be in finely divided form, i. e., should substantially all pass a 30 or 40 mesh screen and should have particle sizes chiefly within the approximate range of 2 to 200 microns or preferably 20 to 100 microns. In other words, the catalyst should be in such finely divided or powdered form that it can be fluidized by gasiform materials flowing upwardly therethrough at low velocity and maintained in dense turbulent suspended phase without segregation or slugging. With supported catalysts the optimum gas velocity is between about 1 and 3 feet per second, e. g., about 2 feet per second, although for some catalysts the gasiform fluid velocity may be as low as .4, and in some cases as high as 6.0 feet per second An iron-type catalyst may be prepared by igniting iron nitrate with optionally added promoters and carrier. An iron nitrate solution which may contain up to 25% copper (based on the iron) may be precipitated onto Super Filtrol or other carrier by alkali carbonates, then dried and impregnated with .5 to 3% of potassium carbonate. After ignition, the catalyst thus prepared may be introduced directly into the reactor and reduced under synthesis conditions. Alternatively I may employ iron catalysts of the type used for ammonia synthesis. Pure iron may be burned in a stream of oxygen, the oxide ($Fe_2O_3$) fused, and the melt broken up and used as such. Promoters may be added to the melt, such for example as 2½ weight per cent silicon or titania, or 5 weight per cent of potassium permanganate based on iron. A preferred catalyst may be prepared by decomposing iron carbonyl to form iron powder, adding 1% sodium carbonate or about 5% of alumina to serve as a promoter, sintering the catalyst for about four hours at about 1550 to 1650° F., and finally reducing the sintered catalyst at about 1550° F. with a reducing gas such as hydrogen. Catalyst particles thus prepared may have a bulk density of about 120 to 150 pounds per cubic foot while the bulk density of iron catalyst precipitated on Super Filtrol or other relatively light carrier may have a bulk density as low as about 20 pounds per cubic foot.

The cobalt-type catalyst may consist essentially of supported cobalt either with or without one or more promoters, such as oxides of magnesium, thorium, manganese, zirconium, titanium, uranium, cerium, aluminum, zinc, etc. The cobalt support is preferably an acid-treated bentonite or montmorillonite clay such as Super Filtrol, but it may in some cases be a diatomaceous earth or a kieselguhr of low calcium and iron content. A porous structure is, of course, essential, and most clay supports require pretreatment by ignition and acid washing. Other supports such as kaolin, alumina, silica, magnesia, and the like, may, of course, be employed, but a high quality Super Filtrol support is preferred. The catalyst may be prepared by precipitating cobalt and promoter carbonates from nitrate solutions in the presence of the support. In the case of thoria, for example, the promoter may be in amounts of 15 or 20% based on cobalt, higher thoria concentrations being objectionable because of their tendency to promote wax formation. The cobalt-Super Filtrol ratio may be varied from about 5:1 to .1:1 but is usually about 1:1 to .3:1. The precipitated catalyst after filtering, washing, and drying is reduced before use preferably with hydrogen at a temperature of about 400 to 650° F. A typical catalyst ready for use may contain about 32% cobalt, 1½% thorium oxide, 2½% magnesium oxide and 64% Super Filtrol.

Instead of the cobalt catalyst, I may employ catalysts of the nickel or ruthenium type. Such catalysts are known to the art, and since no invention is claimed per se in the composition or method of preparation of the iron or cobalt-type catalysts, a further description is unnecessary.

Referring to the drawing, which is a simplified flow sheet of one embodiment of my process, the synthesis gas stream is introduced through lines 10 and 11 into reactor 12, for example, through a distributor plate 13. Means for supplying and removing catalysts from the reactors may be provided. Means for controlling the temperature within the reactors 12 and 33 are to be provided and may be in the form of cooling tubes 12a and 33a extending within the dense phase. It is also contemplated that a cooling liquid may be injected directly into the catalyst bed. Alternatively catalyst may be transferred from the reactor, cooled, and returned.

The synthesis gas charge consists essentially of hydrogen and carbon monoxide in a ratio of between about 1:1 and about 1.8:1. An important feature of my process is the use of a feed of the proper ratio of $H_2:CO$ to the iron system in order to produce the ideal feed for the cobalt system. Higher hydrogen to carbon monoxide ratios reduce the amount of $CO_2$ formed, thereby improving the economics of the process. With a gasiform fluid velocity of about 2 feet per second, the catalyst is maintained in a suspended dense turbulent phase at a density in the general vicinity of between about 20 and about 100 pounds per cubic foot. The density will, of course, depend upon the particular catalyst and whether it is supported or not, but the density should be between about .3 and about .9, preferably about .5 or .6, of the density of the settled catalyst. Temperatures of between about 400 and 750° F. and pressures of between about 75 and 400 pounds per square inch can be used. A preferred range is a temperature of between about 450 and 650° F. and a pressure of between about 100 and 350 pounds per square inch. When iron-copper catalysts are used, substantially lower pressures may be employed. The space velocity through the reactor should be in the general vicinity of 1000 to 10,000 or more volumes per hour of gas per volume of space occupied by the dense catalyst phase of the reactor. Reactor effluent from the first stage is removed overhead from reactor 12 by line 14 and may be heat exchanged with the fresh synthesis gas in line 10. Heat exchanger 15 may be provided for this service.

Thus the product stream, which leaves the reactor 12 through line 14 at about 500° F. and high pressure, passes through a cooler-condenser 15. In this condenser substantially all of the water and a large amount of the normally liquid hydrocarbons are condensed. The cooled mixture is then passed by line 14 to settler 16 from the base of which water and any carry-over catalyst is withdrawn by line 17. A catalyst slurry settler, not shown, may be employed for the recovery of carry-over catalyst from the water in line 17. However, ordinarily, the catalyst carry-over is negligible, and the slurry settler is not necessary. The water can be injected into reactor 12 to control the temperature of reaction. Oxygenated products can be recovered from the stream by solvent extraction, distillation, clay treating, etc.

The liquid hydrocarbon product stream withdrawn from settler 16 through line 18 may comprise about approximately half of the total hydrocarbons produced. This product fraction can be fractionated separately or with the product from the second stage. The gases leaving the top of the separator 16 through line 19 are introduced near the base of scrubber 20 wherein it is scrubbed with a hydrocarbon cut recovered down stream and having a boiling range of between about 350 and 600° F. This cut may be either fractionated with the total product in the final stage, or may be fractionated separately, in which case the same cut can be recirculated in the place of a heavy cut from the over-all product. The heavy cut can be supplied by line 21 and passed by means of pump 22 and line 23 into the upper part of scrubber 20. A portion of the rich absorber oil can be recycled on the scrubber by line 24, but ordinarily a major proportion of the scrubber oil will be withdrawn by line 25 and sent to a suitable fractionator. If desired, this fractionator can be a part of the fractionation system for the total product.

Unreacted synthesis gas and any lighter products that are not removed by the scrubber in 20 are removed by line 26 and may be either treated for carbon dioxide removal in zone 27 or fed directly into the second-stage reactor via line 29. The carbon dioxide removal system diagrammatically illustrated at 27 may be any suitable conventional system such as, for example, that known as the Girbotol Process.

The ratio of hydrogen to carbon monoxide introduced into the second-stage reactor should be approximately 2:1 or 2.2:1. This ratio is preferably obtained by controlling the reaction of the primary stage, but make-up gas may be added via line 31 to regulate the synthesis gas composition to obtain the optimum ratio for use with the cobalt-type catalyst. The unreacted gases are substantially sulfur free. By employing a feed to the iron system with hydrogen and carbon monoxide in the ratio of 1.55:1, the optimum feed for cobalt in the hydrogen-carbon monoxide ratio of 2:1 is produced.

The catalyst in the second stage 33 can be of the precipitated cobalt or nickel type either in a fluidized or stationary bed. Pressures within the second stage should not be above about 50 pounds per square inch and preferably at atmospheric. The temperatures should range between about 340 and about 500° F., preferably below about 420° F. I prefer to operate the second stage with a fluidized dense turbulent phase of catalyst and in general the conditions and properties of the fluidized catalyst phase within the second stage will be similar to that maintained in the first stage. For cobalt-type catalyst, the space velocity should be in the general vicinity of 50 to 1500 volumes of gas per hour per volume of space occupied by the dense catalyst phase.

The reaction effluent from the second stage is removed by line 34 and introduced into a fractionating system. Although this fractionating system may comprise a single tower, it is illustrated in the drawing as comprising a first fractionator 35 and a second fractionator 36.

The reactor effluent from reactor 33 is introduced by line 34 to a condenser system 37 wherein it is cooled to a temperature of about 350° F. It should be understood that, instead of a simple heat exchanger of the steam-generator type, I may effect the cooling and condensing in a baffled scrubber tower by passing the effluent gases upwardly through such a tower countercurrent to a cooled condensate stream recycled from the base thereof. The cooled product from 37 is then introduced into a separator 38 or a vapor-liquid separating chamber from which the bulk of the $C_6$ and substantially all of the lighter hydrocarbons is taken overhead by line 39, whereas the heavier products including a substantial amount of $C_7$ to $C_{11}$ hydrocarbons, but containing substantially no water and negligible amounts of lighter hydrocarbons, are removed as bottoms via line 40 or 40a. This bottoms stream in line 40 may then be passed by pump 41 through heater 42 to fractionator 35, which is operated under such conditions as to take overhead substantially all of the $C_8$ and lighter hydrocarbons. A portion of this overhead may be cooled, condensed, and recycled as reflux. The fractionator 35 may be provided with conventional reboiler means, not shown. The bottoms from fractionator 35 can be removed by lines 43 and 43a as a heavy product fraction. Preferably a portion of this fraction is sent by line 21 for use as a scrubber oil in scrubber 20. It is also contemplated that a catalyst slurry settler, not shown, may be interposed upon line 43, but ordinarily the catalyst carry-over is negligible and such settler may not be necessary. If desired, a scrubber, not illustrated, may be interposed between the second reactor 27 and the fractionation system.

The remaining portion of the product is supplied by line 44 to the second fractionator 36. In the second fractionator 36 a separation of hydrocarbons having more than two carbon atoms to the molecule are separated from the noncondensibles. The condensible hydrocarbons are withdrawn by line 45. This product may be used directly, or may be treated by various refining processes such as isomerization, alkylation, aromatization, hydrogenation, and the like.

Returning to the uncondensed effluent product stream from the top of separator 38, this stream is introduced by line 39 to cooler-condenser system 46 wherein it is cooled to a temperature of about 110° F., after which it is introduced into chamber 47. The bulk of the water is condensed within, and withdrawn from, the base of chamber 47 through line 48. The condensed hydrocarbon liquids pass from separator 47 through line 49 and are introduced by pump 41 through heater 42 to fractionator 35 along with liquid hydrocarbons from separator 38. The uncondensed portion is removed via line 50 from separator 47. These gases may be sent to fractionator 36 via line 44 or can be diverted by line 50a and handled as the gases in line 51.

Unreacted gases, plus carbon dioxide and methane are removed overhead from fractionator 36. If the methane percentage is high these gases may be sent to a reformer furnace by line 52. If desired, the final gas can be treated for carbon dioxide removal and recycled to either the first or second reaction stage. Lines 53 and lines 31, 54, and 11 are provided for these purposes.

From the above detailed description it will be seen that I have attained the objects of my invention and have provided an improved process employing two stages, each with the optimum feed and optimum catalyst to produce additional quantities of hydrocarbons having more than one carbon atom to the molecule and having increased proportions of olefins. The particular sequence is advantageous in that the iron-type catalyst is employed at relatively high pressure, and the cobalt-type is employed at a relatively low pressure. Thus there is a considerable economic advantage which accrues. The iron catalyst is less sensitive to sulfur-containing feed gases and serves the additional useful purpose of supplying a substantially sulfur-free feed gas to the highly sulfur sensitive cobalt-type of catalyst. Likewise the residual CO and $H_2$ from the first stage may be in the proper ratio for use as feed in the second stage. All in all, the features of my invention cooperate to produce a novel and useful process.

The specific example described in more or less detail is for the purposes of illustration only, and it should be understood that the invention is not limited thereto since other modifications and equivalent conditions will readily become apparent from the above description to those skilled in the art.

What I claim is:

1. The process for the production of gasoline hydrocarbons from hydrogen and carbon monoxide mixtures which comprises reacting a first mixture of hydrogen and carbon monoxide in the ratio of less than about 2:1 in the presence of a fluidized iron catalyst under a substantially superatmospheric pressure and a temperature of above about 400° F., removing the total reaction products from the said first stage, and recovering from said products a gaseous fraction including unreacted hydrogen and carbon monoxide, supplying the hydrogen and carbon monoxide in the ratio of about 2:1 to a second reaction stage, contacting the feed gases with a cobalt catalyst in said second stage and at substantially superatmospheric pressure and at a temperature of between about 340° and 500° F., withdrawing the reaction products and unreacted gases from said second stage, and recovering heavier-than-gasoline product fraction, a gasoline hydrocarbon fraction, and a gaseous fraction.

2. The process of claim 1 wherein the heavier-than-gasoline fraction recovered from the second stage is employed as a scrubbing medium for separating from the product stream a gaseous fraction including the hydrogen and carbon monoxide fed to the second stage.

3. In the process of producing hydrocarbons by the conversion of hydrogen and carbon monoxide mixtures in a plurality of stages, the improvement which comprises supplying a stream of hydrogen and carbon monoxide in the ratio of between about 1:1 and about 1.8:1 to a first stage wherein it is contacted with an iron catalyst under superatmospheric pressure and at a temperature of between about 400 and about 650° F., maintaining said catalyst in a dense turbulent suspended phase within said first stage, continuously separating reaction products and catalyst, withdrawing the reaction products together with unreacted gases from the said first stage, scrubbing the total reaction products with a heavy hydrocarbon cut to produce a residual stream comprising essentially hydrogen and carbon monoxide, contacting the residual stream in the ratio of between about 2.0:1 and about 2.2:1 with a cobalt catalyst in a second reaction zone at about atmospheric pressure and at a temperature of about 340 and 420° F., maintaining said catalyst in a dense turbulent suspended phase within said second reaction zone, continuously separating reaction products and catalyst, withdrawing the reaction products from said second stage, separating a heavy product cut from the reaction products withdrawn from the second stage, and recycling at least a part of the heavy cut as a scrubbing medium in the scrubbing step following the first reaction step.

4. In the process of producing hydrocarbons by the conversion of hydrogen and carbon monoxide mixtures in a plurality of stages, the improvement which comprises supplying a stream of hydrogen and carbon monoxide in the ratio of between about 1:1 and about 1.8:1 to a first stage wherein it is contacted with an iron catalyst under superatmospheric pressure and at a temperature of between about 400 and about 650° F., maintaining said catalyst in a dense turbulent suspended phase within said first stage, continuously separating reaction products and catalyst, withdrawing the reaction products together with unreacted gases from the said first stage, scrubbing the total reaction products with a heavy hydrocarbon recycle fraction to produce a residual product stream comprising essentially hydrogen and carbon monoxide in the ratio of between about 2.0:1 and about 2.2:1, contacting the gaseous product stream with a cobalt catalyst in a second reaction zone at about atmospheric pressure and at a temperature of about 340 and 420° F., maintaining said catalyst in a dense turbulent suspended phase within said second reaction zone, continuously separating reaction products and catalyst, withdrawing the reaction products from said second stage, separating a heavy product fraction from the reaction products withdrawn from the second stage, recycling at least a part of the heavy fraction as a scrubbing medium in the scrubbing step following the first reaction step, withdrawing from the scrubbing step an enriched heavy fraction and fractionating the withdrawn material, recovering a second product fraction from the second reaction stage comprising essentially a light gasoline boiling range material, recovering a gas stream comprising unreacted gas, carbon oxides, and methane, and supplying the said gas stream to a gas preparation step wherein the feed gas comprising hydrogen and carbon monoxide in the ratio of between about 1:1 and 1.8:1 is produced.

HAROLD E. HUBER, Jr.

REFERENCES CITED

The following references are of record in the file of this patent:

UNITED STATES PATENTS

| Number | Name | Date |
|---|---|---|
| 2,244,710 | Kolbel | June 10, 1941 |
| 2,149,515 | Fischer | Mar. 7, 1939 |
| 2,347,682 | Gunness | May 2, 1944 |